Jan. 14, 1969  W. A. ACOSTA  3,421,630

FILTER ELEMENT AND FILTER SYSTEM

Filed April 15, 1966

INVENTOR.
WILLIAM A. ACOSTA

BY
Caesar, Rivise,
Bernstein & Cohen
ATTORNEYS.

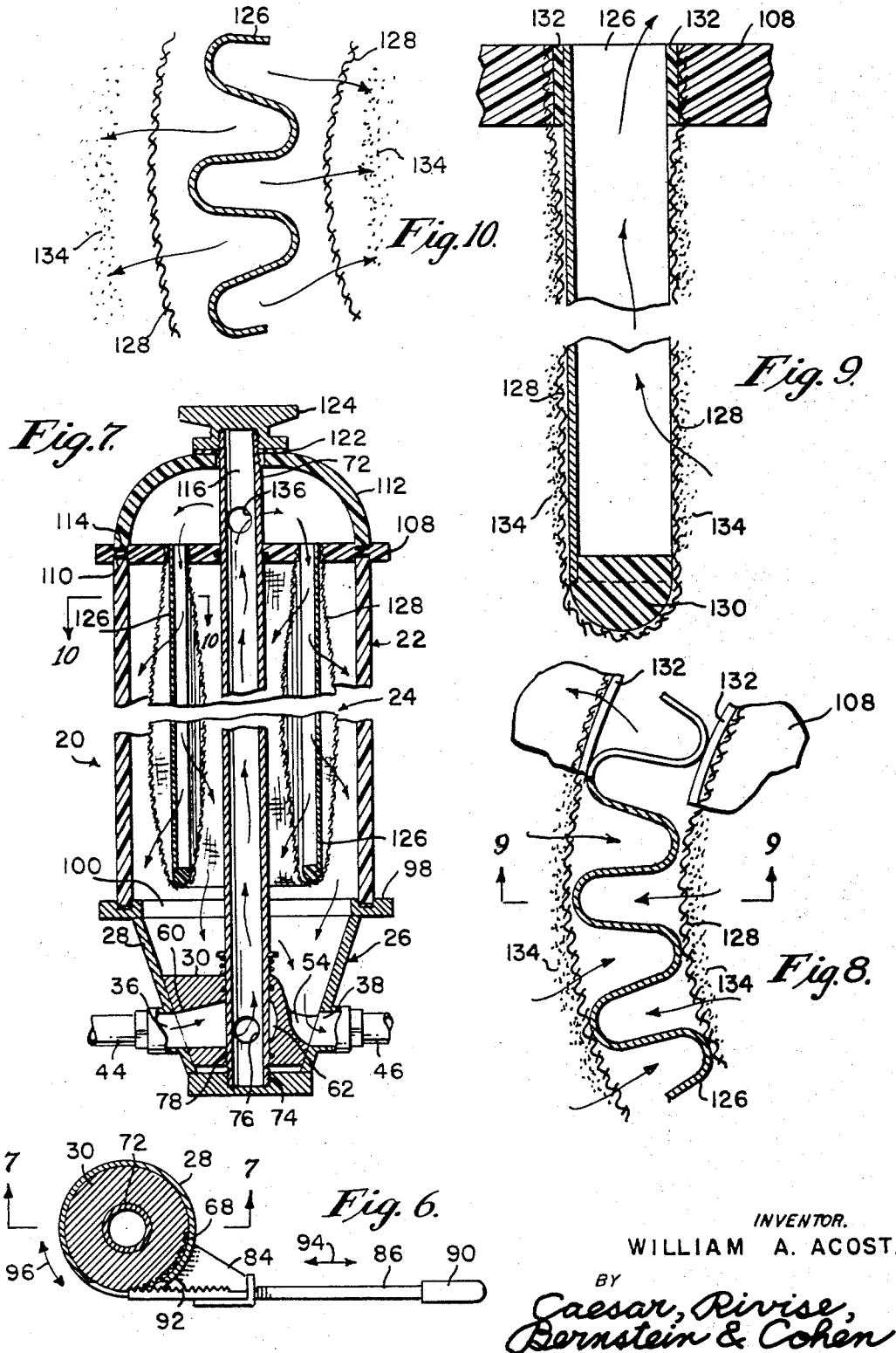

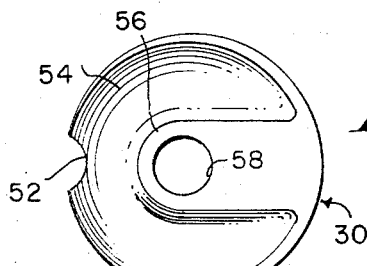
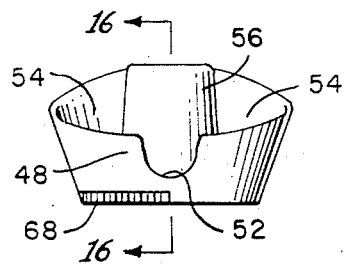
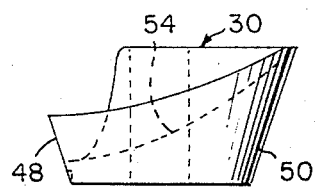
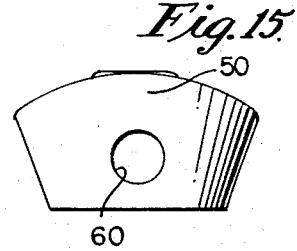
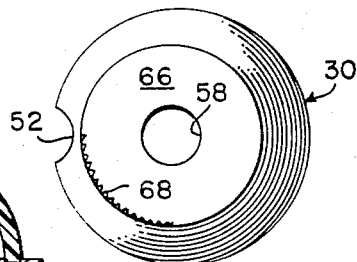
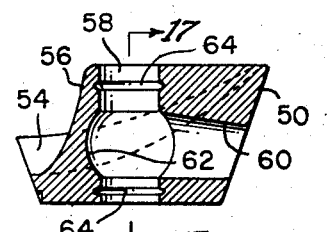
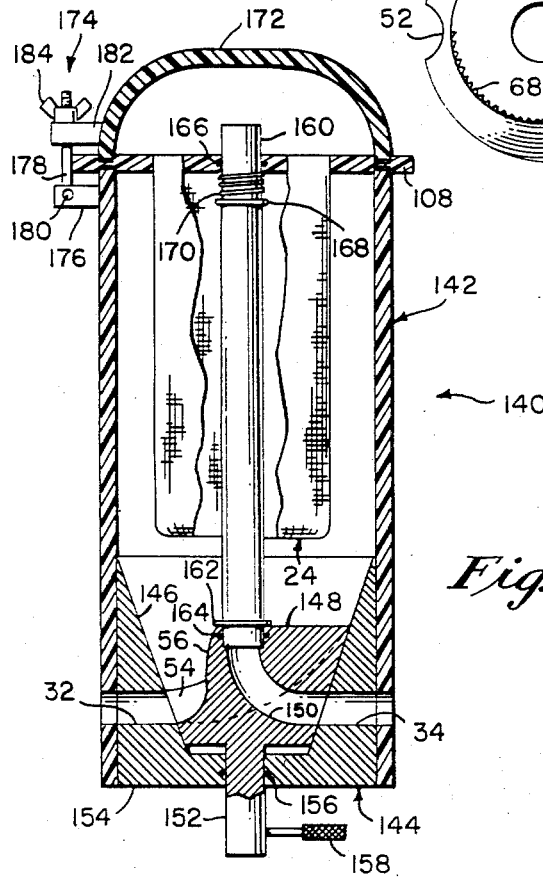
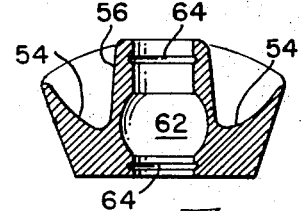

United States Patent Office 3,421,630
Patented Jan. 14, 1969

3,421,630
FILTER ELEMENT AND FILTER SYSTEM
William A. Acosta, 5160 Butler Park,
Plymouth Meeting, Pa. 19462
Filed Apr. 15, 1966, Ser. No. 542,835
U.S. Cl. 210—411                                11 Claims
Int. Cl. B01d 35/22

ABSTRACT OF THE DISCLOSURE

A filter system comprising a valve, a filter vessel associated with the valve and a filter element positioned within the vessel. The valve is exposed to the interior of the vessel and includes a rotatable ported plug element in a housing for controlling fluid flow through the filter vessel. A tube is connected wtih the plug which is in communication with filtered fluid for delivering filtered fluid through the plug.

---

This invention relates to a valve, and more particularly, to a novel valve which is particularly adapted for use in a filtration system.

It is now the practice when using industrial equipment which utilizes a continuous flow of liquid to filter and recirculate the liquid during use. For instance, cutting oil is continually used in such industrial processes as milling or turning on a lathe. The oil will become contaminated wtih metal particles or dirt during use and must be filtered in order to be recirculated and re-used. The current practice of filtering and re-using the oil is to pump the oil through a filter system wherein the oil will pass through a filter medium and be returned to a trough for storage and re-use. Whenever the pump is turned on for the oil, a valve is opened which permits the oil to pass through the filter medium. Periodically, the filter medium must be cleaned in order to remove any accumulated muck or dirt which has been built up within the filter. When this is done, the valve which admits the oil and the valve which permits the removal of the filtered oil are both closed. Thereafter, a third valve connected to the filter tank is opened which permits the backwashing of the filter. Simultaneously with the opening of the third valve a fourth valve is opened which permits the backwash material and contaminants to be removed. The backwash material can be· air, clean oil or any other carrier liquid.

It is thus seen that using the prior art filtration systems it is necessary to manually open four individual valves in order to obtain effective filtration and periodic cleaning of the filter medium. Using the valve of this invention in combination with a filter tank, only a single hand operation must be carried out in order to obtain filtration and backwash. Furthermore, this operation can easily be adapted to automatic control, which control can be electrically or pneumatically actuated. Using the valve of this invention, which can be automatically actuated, permits the use of a continuous filtration system for a fluid. Furthermore, the valve of this invention is adapted for continuous or intermittent filtration of substantially any fluids. Thus, it can be used equally well for the filtration of particles from air or other gas.

Another aspect of this invention relates to a novel filter element which may be used in connection with the valve of this invention. Although the filter element is particularly adapted for use with the valve of this invention, it can be used in connection with any other valve of the prior art, or with a bank of manually operated valves, such as those discussed above.

It is therefore an object of this invention to provide a novel valve.

It is another object of this invention to provide a valve which is adapted for automatic control.

It is a further object of this invention to provide a multi-ported valve which can be used for continuous flow or for the stoppage of all flow by sealing all of the ports simultaneously.

It is a further object of this invention to provide a novel filtration system.

It is a further object of this invention to provide a novel filter.

It is a further object of this invention to provide a novel filter which is easily cleaned to permit re-use.

It is a further object of this invention to provide a novel filter which is inexpensive to manufacture and may easily be replaced.

It is a further object of this invention to provide a novel filter which includes a large filtering surface area while causing a small cubic displacement.

These and other objects of this invention are accomplished by providing a valve comprising a hollow body and a plug rotatably mounted in said body, said body having a plurality of spaced ports formed in the wall thereof, said plug having a first channel formed therein, said channel adapted to be in fluid communication with one of said ports, said plug having a second channel formed therein, said second channel adapted to be in communication with another of said ports when said first channel is in communication with said one of said ports, said channels adapted to be connected in fluid communication with each other, and means for rotating said plug to bring said channels out of and into communication with two of said ports.

Other objects and many of the attendant advantages of this invention will be readily appreciated as the same becomes better understood by reference to the following detailed description when considered in connection with the accompanying drawings wherein:

FIG. 6 is a sectional view similar to FIG. 5, but showing the alternate position for the plug of the valve of this invention;

FIG. 7 is a sectional view taken along the line 7—7 of FIG. 6;

FIG. 8 is an enlarged sectional view taken along the line 8—8 of FIG. 2, with portions shown in plan for the purpose of clarity;

FIG. 9 is a sectional view taken along the line 9—9 of FIG. 8;

FIG. 10 is an enlarged sectional view taken along the line 10—10 of FIG. 7;

FIG. 11 is a side elevational view of the plug of the valve of this invention;

FIG. 12 is a top plan view of the plug of FIG. 11;

FIG. 13 is a bottom plan view of the plug of FIG. 11;

FIG. 14 is a front elevational view of the plug of FIG. 11;

FIG. 15 is a rear elevational view of the plug of FIG. 11;

FIG. 16 is a sectional view taken along the line 16—16 of FIG. 14;

FIG. 17 is a sectional view taken along the line 17—17 of FIG. 16; and

FIG. 18 is a sectional view of a modified embodiment of the filter system of this invention.

Figure 2:
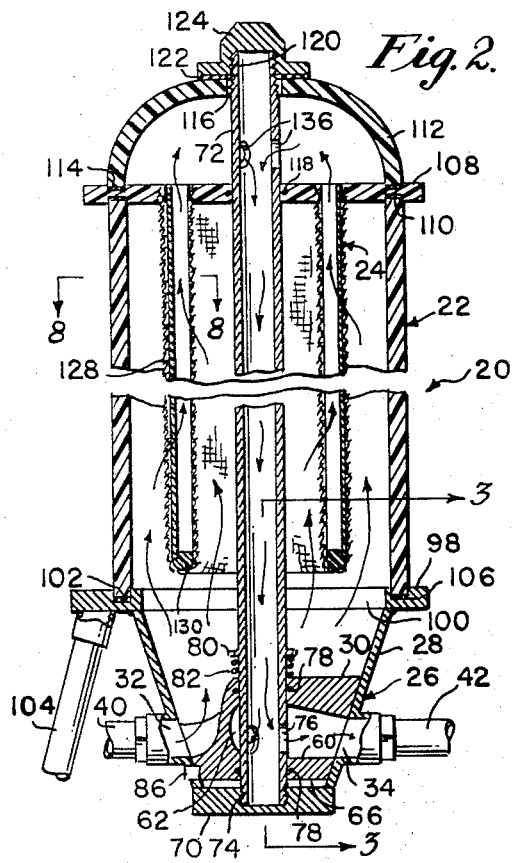
FIG. 2 is an enlarged sectional view taken along the line 2—2 of FIG. 1.

Referring now in greater detail to the various figures of the drawings wherein similar reference characters refer to similar parts, a filtration system embodying the present invention is generally shown at 20 in FIG. 2. Filtration system 20 basically includes a vessel 22, a filter 24 and a valve 26.

Figure 4:
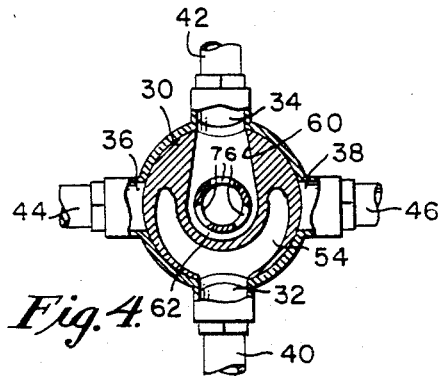
FIG. 4 is an enlarged sectional view taken along the line 4—4 of FIG. 1.

Valve 26 basically comprises a body 28 and a plug 30. Body 28 is provided with ports 32, 34, 36, and 38 (FIG. 4). As is apparent from FIG. 4, ports 32 and 34 are aligned with each other and ports 36 and 38 are aligned with each other. Additionally, each port is 90° out of phase with the adjacent port on either side. Pipes 40, 42, 44 and 46 are secured to the body at ports 32, 34, 36 and 38, respectively.

Plug 30 rests in the center of body 28. As seen in FIG. 2, the body 28 is hollow and includes an inwardly tapering wall in going from its top to its bottom. The outer wall of plug 30 also contains the same taper, and therefore a smooth fit is obtained by the complementary walls of body 28 and plug 30. Additionally, plug 30 is rotatable within body 28.

Referring to FIGS. 11 to 17 it is seen that plug 30 includes a low front wall portion 48 which gradually rises to form a raised rear wall portion 50. Front wall 48 is provided with an arcuate notch 52 which is in communication with a channel 54 formed in the top surface of the plug. As best seen in FIG. 14, channel 54 is split and diverges about a central hub 56. Additionally, as seen in FIG. 11, the bottom of channel 54 rises in going from front wall 48 to rear wall 50.

A central bore 58 passes vertically through hub 56. A channel 60 is formed in wall 50 and projects inwardly into communication with bore 58. An enlarged cavity 62 is formed at the junction of bore 58 and channel 60. O-ring grooves 64 are formed above and below cavity 62.

As seen in FIG. 13, the lower surface 66 of plug 30 has a circular cross-section. One quadrant of this surface is provided with gear teeth 68. The gear teeth 68 are cut directly into the plug 30. When the plug is a molded plastic, the gear teeth can be structurally reinforced, as by providing a metallic strip of gear teeth which will be secured to the cut gear teeth in the plug or by molding metal gear teeth into the plug.

Figure 3:
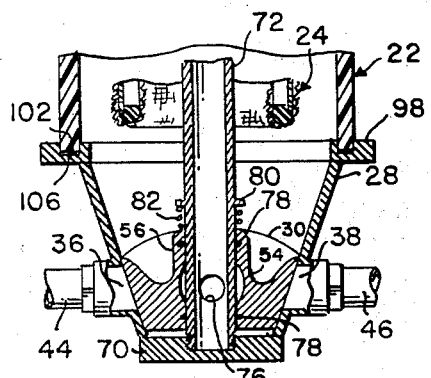
FIG. 3 is a sectional view taken along the line 3—3 of FIG. 2.

Referring again to FIG. 2, it is seen that body 28 is provided with a circular plate 70 at its bottom. Plate 70 can be secured to the body 28 by any suitable means such as welding. In the embodiment shown, the plate 70 is additionally held against the bottom of body 28 by threaded securement with central tube 72. Thus, central tube 72 is threadedly secured in plate 70, as shown at 74 in FIG. 2. Central tube 72 passes through bore 58 in plug 30. As seen in FIG. 4, central tube 72 includes three equally spaced ports 76 which are in communication with cavity 62 and channel 60. O-rings 78 (FIGS. 2 and 3) are placed above and below cavity 62 and are received in O-ring grooves 64 (FIG. 17).

A collar 80 is telescoped over tube 72 and is held in place by any suitable means such as an annular groove cut in tube 72 which will receive a split collar or by welding. A compression spring 82 abuts collar 80 and hub 56 on plug 30. Spring 82 forces plug 30 downwardly in valve body 28.

Figure 5:
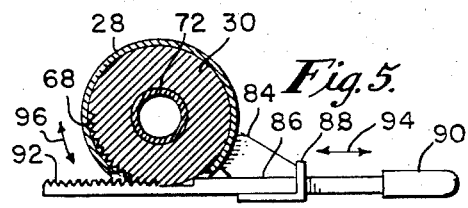
FIG. 5 is an enlarged sectional view taken along the line 5—5 of FIG. 1.

A bracket 84 (FIG. 1) is secured to the lower surface of plate 70, as by welding. A rod 86 (FIG. 5) passes through an opening in plate 88 of bracket 84. As seen in FIG. 2, rod 86 has a square cross-section. Rod 86 includes an enlarged handle 90 at one end thereof, and the other end of rod 86 is provided with gear teeth 92. As seen in FIGS. 5 and 6, the longitudinal length of gear teeth 92 is equal to the circumferential length of gear teeth 68. As is apparent from arrows 94, rod 86 is adapted to reciprocate longitudinally. As is further apparent from arrows 96, plug 30 and its associated gear teeth 68 are adapted to oscillate. Thus, the combined effect of rod 86 with its associated gear teeth on plug 30 with its associated gear teeth is to translate longitudinal movement into rotational movement. To this extent, the rod and plug act as a rack and pinion connection.

Figure 1:
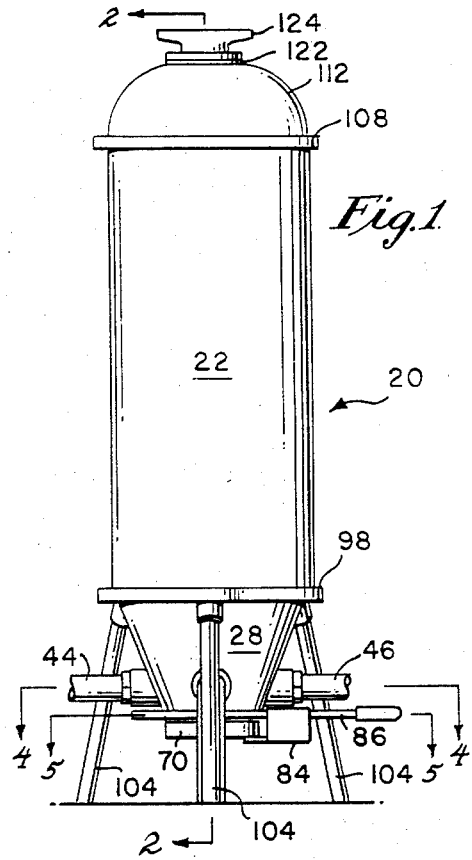
FIG. 1 is a front elevational view of a filter system embodying the valve and filter of this invention.

Valve body 28 is secured to circular plate 98, as by welding. Plate 98 includes a central circular opening 100 which is equal in diameter to the inner diameter of body 28. Plate 98 is also provided with an annular groove 102 in its upper surface. Three angularly disposed legs 104 are secured to the bottom of plate 98. As seen in FIG. 1, legs 104 support the entire filtration system 20.

Vessel 22 is circular in cross-section and has its lower edge received in annular groove 102. A gasket 106 is positioned below the lower edge of the vessel within groove 102. The upper edge of vessel 22 is received in an annular groove of separator plate 108. Again, the groove contains a gasket 110. A cover 112 has its lower edge received in an annular groove in the top surface of separator plate 108. Here again, a suitable gasket 114 is positioned within the groove.

Central tube 72 passes upwardly through separator plate 108 and through a central opening 116 in cover 112. An O-ring 118 surrounds tube 72 in the area of plate 108. The top of tube 72 is threaded as seen at 120. A gasket 122 is telescoped over the top of tube 72 and a cover nut 124 is threadedly secured on tube 72 and bears against gasket 122.

It is thus seen that tube 72 serves to maintain all of the elements of assembly 20 in place. Thus, the tube has its lower end threadedly secured in plate 70 and has an adjustable pressure applied against the entire assembly through the tightening of cover nut 125 on the top end of tube 72. Furthermore, all connections with the tube are liquid and air tight. Thus, O-rings 78 prevent any liquid or air leakage around ports 76. O-ring 118 prevents any leakage through separator plate 108 in the area of the tube. Gasket 122 prevents any leakage through the top of the assembly in the area of the tube. The spring 82 forces plug 30 downward, thereby preventing any leakage between the plug and its associated body 28. Gaskets 102, 110 and 114 prevent any leakage at the connection points for vessel 22 and cover 112. Since the entire assembly is held rigidly in place by the central tube 72, the entire vessel can be and is used as a pressure vessel, as will be explained hereinafter.

Separator plate 108 serves a first function of separating the filtration chamber into an area of clean fluid above the plate and an area of contaminated fluid below the plate. Plate 108 serves a second function of supporting the filter element 24. Flter element 24 is circular in cross-section and comprises a pleated cylindrical ring 126 (FIG. 8) and a foraminous covering 128. By way of example, covering 128 can be a nylon fabric. The bottom of pleated ring 126 is capped by a ring 130 which is secured within the bottom of ring 126. Plug 130 can conveniently be a cast plastic which is embedded in place. As seen in FIGS. 8 and 9, bands 132 are secured to the inner and outer edges of pleated ring 126. The fabric screen 128 is preferably formed from a tubular fabric which is put in place by first passing the tube vertically downward through the center of ring 126. Thereafter, the tube of fabric is folded backward whereby it will be lifted vertically upward along the outer surface of ring 126. In doing this, the fabric will pass on the exterior sides of bands 132, as seen in FIGS. 8 and 9.

After the fabric has been placed on ring 126, the ring is secured in plate 108. This is accomplished by casting the ring within the plate 108 during the formation of the plate. A preferred material for the plate is an epoxy resin. During the casting process, the plate 108 will be adhered to bands 132. At the same time, the top edges of fabric 128 will be bound in place by the cast resin. The use of bands 132 prevents any of the resin from flowing into the pleated or undulated ring 126. Thus, as seen in the portion of FIG. 8 shown in plan, the bands 132 will merely contact and be secured to the outer extremities of the pleats, with the central portions remaining completely open.

In use, the entire assembly 20 will first be in the condition shown in FIG. 2. While in this condition, contaminated fluid will enter the assembly through pipe 40. By way of example, the contaminated fluid can be cutting oil from a milling machine which has been contaminated with dirt and cut chips and splinters of metal. The oil is pumped through pipe 40 and through port 32 of body 28. The oil is then directed upwardly by passing through channel 54 in plug 30. The only direction that the oil can travel is upwardly in view of the fact that there is a tight seal between the complementary tapering surfaces of the plug and the body 28. Thus, ports 36 and 38 are completely closed by the plug, as seen in FIG. 4. Likewise, wall 50 of the plug will seal port 34 from any of the incoming oil entering through port 32. Cavity 62 is sealed from the incoming oil by upper O-rings 78.

The incoming oil travels upwardly, fills the hollow body 28, and rises into vessel 22. In passing upwardly, the oil will pass through fabric 128 and into the channels formed by the pleated ring 126. As is apparent from the arrows in FIG. 2, the oil will enter the pleats from both the inner and outer side of ring 126. Since the vessel 22 is liquid tight, and since the bottom of ring 126 is sealed by plug 130, the only path the contaminated oil can follow is through the fabric 128 and into the channels of ring 126.

During this upward travel of the contaminated oil, the contaminants within the oil are deposited on fabric 128 as shown at 134 in FIG. 8. The oil passing through the fabric into the ring 126 will be completely free of all the contaminants, which are filtered out by the fabric. Thus, as explained above, the only possible path which the oil can follow is through the fabric. Since the oil is being pumped into the filtering system 20, the clean oil will collect above separator plate 108. The level of the cleaned oil will continue to rise until it reaches the ports 136 (FIG. 2) in the upper portion of tube 72. At this time, the oil will pass into the ports 136 and downwardly through tube 72.

After the oil has passed down through tube 72, as shown by the arrows in FIG. 2, it will pass out through ports 76 in the tube into cavity 62 in plug 30 and through channel 60 in the plug. Thereafter, the cleaned oil will pass through port 34 in body 28 and out through pipe 42. At this point, the oil can be collected for re-use or can be recirculated for continual use.

As the filtration process is continued, the contaminants 134 will continue to build up on screen 128. Eventually a point will be reached where the contaminant layer is of such a thickness as to prevent further efficient flow rate. When this point is reached, the filter must be cleaned of its contaminants. In order to accomplish the cleaning, plug 30 is rotated 90° counterclockwise, as viewed in FIG. 4. This is accomplished by pulling handle 90 of rod 86 to the right, as viewed in FIG. 5. When this is done, gear teeth 92 will mesh with gear teeth 68 and rotate the plug exactly one quadrant, as seen in FIG. 6. When this is done, channel 60 will be aligned with port 36 (FIG. 7) and channel 54 will be aligned with port 38. As best seen in FIG. 4, during this rotational movement ports 32, 34, 36 and 38 will all be closed by the wall of plug 30. Thus, there is no danger of an unwanted fluid entering or leaving any of the ports during the shifting of plug 30. In this connection, it should be noted that vessel 22 will be completely filled with contaminated liquid at the time the shifting of the plug takes place and there will be a low level of clean liquid above separator plate 108 during this shifting.

Immediately upon the completion of the shifting, a backwash fluid will be forced under pressure through pipe 44. By way of example, the backwash fluid can be air at approximately 35 p.s.i. As best seen in FIG. 7, the air will enter pipe 44, pass through channel 60 into cavity 62 and then into ports 76 of pipe 72. The air will follow the path of the arrows in FIG. 7 up through pipe 72 and out through ports 136. It will then pass downwardly along the pleats of ring 126 and out through fabric 128. As seen in FIG. 7, this causes a billowing of the fabric away from the ring. As best seen in FIG. 10, air pressure, in addition to forcing the fabric 128 outward, also removes all of the accumulated muck or contaminants 134 from the fabric. Since the vessel 22 was previously filled with liquid and the supply of the air pressure is substantially instantaneous after the plug 30 has been rotated, the liquid still remains within the vessel when the air pressure is introduced. Therefore, the removed contaminants 134 are immediately carried away by the liquid which remains in the vessel. Thus, as seen in FIG. 7, the liquid with the entrained removed contaminants follows the path of the arrows to channel 54 in plug 30. Thereafter the liquid will pass through port 38 to pipe 46 where it can be disposed of or further treated.

After all of the contaminated liquid has been removed by the backwashing operation, rod 86 is again reciprocated to the position shown in FIG. 5. At this point, the plug will be in the position shown in FIG. 2 and the apparatus is again adapted for use in filtration.

A modified embodiment of the filtration system of this invention is generally shown at 140 in FIG. 18. Device 140 includes a vessel 142, filter element 24 which is identical to that of embodiment 20, and valve 144. Valve 144 includes a body 146 and plug 148. Body 146 includes ports 32 and 34, and ports 36 and 38 which are not shown. Vessel 142 is integrally attached to body 146 and includes ports which are aligned with the ports in body 146. Plug 148 is substantially the same as plug 30. However, channel 60, cavity 62 and bore 58 have been replaced by a single arcuate channel 150. Channel 150 has one end in communication with port 34 and the other end passes through the top of hub 56. Plug 148 also includes an elongated boss 152 projecting from the bottom thereof. Boss 152 passes through an opening in base 154 of body 146. An O-ring 156 is positioned within base 154. A handle 158 is secured in the portion of boss 152 which projects below base 154.

A tube 160 having a collar 162 adjacent its lower end is inserted in the top of channel 150. The insertion is such that the collar 162 results on the top of hub 56. An O-ring 164 is positioned against tube 160. The top of tube 160 passes through plate 108. Again, a suitable O-ring 166 is used. A collar 168 is secured on tube 160 adjacent its top. A compression spring 170 is telescoped over tube 160 and is mounted between collar 168 and separator plate 108. It is thus seen that the force of compression spring 170 is transmitted through the tube to collar 162, which in turn transmits the force against plug 148 thereby insuring an effective seal between the walls of the plug and the inner wall of body 146.

In this embodiment the filter element 24 is identical to that previously described. Cover 172 is similar to cover 112. However, cover 172 is impervious and tube 160 will not pass through the cover. Instead, the cover 172 is secured in place by a group of swing bolts 174. Each swing bolt 174 includes a tab 176 which is secured to vessel 142. Bolt 178 is pivotally secured in tab 176 by pin 180. A second tab 182 is secured to cover 172. This tab includes a slot projecting longitudinally inward from its outer edge. In use, bolt 178 will be pivoted upwardly into the slot in tab 182. Thereafter, a wing nut 184 will secure the bolt in place. Through the use of two or more swing bolts 174, the cover 172 will be held securely in place. In a preferred embodiment three swing bolts will be used. As an alternative to the use of the swing bolts, tie rods can be used for maintaining the cover in place.

Any materials known to the art for use in valves and filter systems can be used with the valve and filter of this invention. For example, the valve body can be of stainless steel, brass or aluminum. The plug is preferably a molded plastic although it can be metal. The reason that plastic is preferred is that there is less frictional resistance to the rotation of the plug when the plug is plastic. Polypropylene is a preferred plastic but other plastics such as nylon can be used. When the plug is formed from plastic, it may be desirable to reinforce the gear teeth 68 with metal gear teeth which are molded in place or subsequently secured in place.

The vessels 22 and 142 can be of any material that can withstand the pressure of the backwashing. Thus various metals such as steel or aluminum may be used. Alternatively, molded transparent plastics such as Plexiglas can be used whereby the accumulation of the contaminants on the fabric 128 can be viewed. Fiber glass reinforced epoxy resin has been found to be effective both from the stand point of structure and durability in use. Likewise, the covers 112 and 172 can be formed from the same materials as vessel 22.

Ring 126 can be fabricated from plastic or metal. Any of the aforementioned plastics or metals can be used. From the standpoint of economy of manufacture and economy of replacement, the pleated ring 126 can be formed from porous paper, such as filter paper, which has been impregnated and coated with epoxy resin. Likewise, bands 132 can also comprise the same type of paper impregnated with epoxy resin. In this way a strong bond can be obtained between the ring 126 and the bands 132. The separator plate 108 can be a cast epoxy resin. However, any of the moldable plastics such as polyethylene, polypropylene or nylon can be used. The plugs 130 are also preferably cast plastic, such as epoxy resin.

The foraminous covering 128 can be any material which will permit the passage of a fluid but prevent the passage of solids. Nylon fabric is a preferred material for a number of reasons. Thus, nylon has a great deal of inherent strength. Additionally, nylon also has an inherent lubricating property whereby the accumulated containants are easily released during the backwash cycle. Using other fabrics, the release property may not be as great and replacement of the filter would have to be carried out more frequently. Other materials that can be used for the foraminous covering are wire cloth and cotton. If desired, a coating of absorptive materials such as diatomaceous earth can be deposited on the foraminous covering to aid in filtration.

Although the filter element can be continually cleaned using the device of this invention, replacement when necessary is simple and economical. Thus, all that is necessary is to remove the cover 112 and lift the separator plate 108 having the filter element 24 secured thereon vertically upward. A new filter element is easily dropped in place and the device is ready for use within an extremely short time.

One of the features of the filter element of this invention is that a great deal of surface area for filtration is presented in a relatively small volume of space. Thus, a filtering surface area is present on both sides of the pleated ring 126 can be varied to suit the needs of the user. The ring 126, as is apparent from FIG. 8. The height of the surface area presented by the ring is substantially greater than that which could be obtained when using a horizontal screen filter.

One of the main features of the valve of this invention is the fact that it is readily adapted for automatic control. Thus, rod 86 can be connected to a pneumatic piston which is in turn timer controlled. Thus, an operator can determine the normal timing cycle for filtration and the necessary backwash for any given machine. For instance, it may be determined that a period of ten minutes continuous filtration will result in an accumulation of contaminants on the filter which will prohibit further effective flow rate. The operator may further determine that a period of three seconds is needed for complete backwash. Thus the pneumatic piston would be set to operate in the filtration position for a period of ten minutes and in the backwash position for a period of three seconds. Through the use of centrifugal pumps, the feeding of the oil or other liquid can be maintained continuously to the filter system. When the system is in the backwash position, there is no fear of the pumps forcing liquid into the filter system in view of the fact that all ports are closed during the change in position. Thus no contaminated liquid will be added until the channel 54 is aligned with port 32.

In instances where automatic control is unnecessary and manual control will be used, the device shown in FIG. 18 can be used. Thus, the entering liquid will pass through port 32 up through channel 54 and through the filter in the manner described above. In this embodiment the liquid entering tube 160 enters by way of overflow into the top of the tube. The clean liquid passes through the bottom of the tube and out through channel 150 to port 34. When backwashing is necessary, handle 158 can manually be rotated to have the plug 148 in the backwash position. Suitable stops can be used to insure that the channels 54 and 150 are always properly aligned with their respective ports. In this connection, the rack and pinion arrangement shown in FIGS. 5 and 6 will also insure proper alignment of the channels at their respective ports, in view of the fact that the gears are arranged so as to move the plug exactly one quadrant.

Although the device has been described as being used with cutting oil, it is to be understood that it can be used with any fluid. Thus it can be used for filtering well water or for filtering hydraulic oil. The porosity of the foraminous material 128 can also be made sufficiently fine to adapt the system for the filtering of contaminants from air. Although the backwash fluid has been described as being air, other materials can also be used. Thus, in many instances clean fluid which has been filtered can be used for backwashing the system.

Although the valve has been described as being specifically used with the filter 24, the valve can also be used with any of the prior art filters. Thus, the valve can be used with the prior suspended tube filters or bed filters. Likewise, the filter 24 can be used with valves other than the valves of this invention. Thus, four individual gate valves can be associated with the filter housing in order to accomplish filtration. However, the combination of the valve of this invention and the filter of this invention is novel and the two elements provide an extremely efficient system in combination.

One of the features of the system in combination is the fact that a spring pressure is always applied against the plug 30. Thus this pressure is transmitted by spring 82 or spring 170. Having this spring pressure insures that the plug 30 will always be properly seated in the body 28, thereby insuring that there will never be any leakage. Although the valve will work just as effectively without the spring, the spring does serve as an additional insurance value. Even without the spring, however, the weight of the fluid will still force the plug downward because of the tapering sides, and for this reason effective sealing can be accomplished.

Although cylindrical ring 126 is shown as having a substantially circular cross-section, the cross-section can be of other continuous ring shapes, such as square, hexagonal or free-form. Additionally, the number of rings 126 can be varied. Thus, in large vessels concentric rings or spaced rings can be used.

Without further elaboration, the foregoing will so fully illustrate my invention, that others may, by applying current knowledge, readily adapt the same for use under various conditions of service.

What is claimed as the invention is:

1. A filter system comprising a valve, a filter vessel associated with said valve, and a filter element positioned within said vessel, said filter element having a first side adapted to contact a dirty fluid and a second side adapted to contact a filtered fluid, said valve comprising a hollow body and a plug rotatably mounted in said body, said body having a plurality of spaced ports formed in the wall thereof, said plug being rotatable around a vertical axis and having a top surface at the bottom of said vessel exposed to fluid within said vessel, said plug having a first channel formed therein, said first channel adapted to be in fluid communication with one of said ports, said plug having a second channel formed therein, said second channel adapted to be in communication with another of said ports when said first channel is in communication with said one of said ports, said channels adapted to be connected in fluid communication with each other, means for rotating said plug to bring said channels out of and into communication with two of said ports, and means connecting said second channel in fluid communication with said second side of said filter element, said connecting means comprising a vertical tube, with one end of said tube being mounted in said plug and in fluid communication with said secnod channel and the other end of said tube being in fluid communication with said second side of said filter element, whereby dirty fluid is adapted to enter said filter system through said first channel, pass through said filter element where it is filtered, and said filtered fluid will pass from said filter system through said tube and said second channel.

2. The filter system of claim 1 wherein said filter element comprises a ring, said ring being vertically extending and formed from a rigid undulated material, with the undulations being horizontally extending, and a flexible foraminous covering over said ring, whereby said undulations serve to keep the plies of said flexible foraminous covering on the interior and exterior perimeters of said ring spaced from each other, and said undulations serve as channels for conveying filtered fluid.

3. The filter system of claim 2 and further including an impervious plate secured to said ring adjacent the top thereof, with said ring passing through said plate, said plate being mounted horizontally within said vessel, with the upper side of said plate being in fluid communication with said second side of said foraminous covering.

4. The filter system of claim 3 wherein said other end of said tube passes through said plate and has a fluid opening above said plate whereby filtered fluid will pass into said fluid opening and down through said tube into said second channel.

5. The filter system of claim 4 and further including spring means associated with said tube, said spring means being adapted to urge said plug downwardly in said body.

6. The filter system of claim 1 wherein said body includes four ports, with said plug being rotatable from a position having said channels in communication with two of said ports to a position having said channels in communication with the other two of said ports.

7. The filter system of claim 6 wherein said plug can be rotated to a position wherein said channels are out of communication with all of said ports and said ports will be sealed by the wall of said plug when in said position.

8. The filter system of claim 1 wherein said body includes four ports, with said plug being rotatable from a first position having said channels in communication with two of said ports, said filter system being adapted to filter a fluid while in said first position by having said fluid pass through said first channel, said filter element, and down through said tube and out through said second channel, said plug being rotatable to a second position having said channels in communication with the other two of said ports, said filter system adapted to be cleaned when said plug is in said second position whereby a cleaning fluid will pass through said second channel, up through said tube, through said filter element and out through said first channel.

9. The filter system of claim 1 wherein said filter vessel includes a removable cover, and said filter element may be removed by first removing said cover and thereafter lifting said filter element from said vessel.

10. The filter system of claim 9 wherein said lower end of said tube passes through said plug and is secured in a horizontal plate below said plug, said tube having ports therein in fluid communication with said second channel, and the upper end of said tube projects through said cover, and means associated with said upper end for holding said cover in place.

11. The filter system of claim 1 wherein said valve and vessel are vertically arranged, with said valve being positioned at the bottom of said vessel, said body being open at its top and being in communication with the interior surface of said vessel.

References Cited

UNITED STATES PATENTS

| 261,119 | 7/1882 | Adams | 210—425 |
| 1,633,818 | 6/1927 | Kogstrom | 210—487 X |
| 2,586,513 | 2/1952 | Butler | 210—497 X |
| 3,154,485 | 10/1964 | Liddell | 210—410 X |
| 3,211,292 | 10/1965 | Bull | 210—444 X |
| 3,280,980 | 10/1966 | King | 210—411 X |
| 3,283,904 | 11/1966 | Buckman et al. | 210—497 X |
| 3,305,098 | 2/1967 | Cowles | 210—497 X |
| 3,327,865 | 6/1967 | Thompson | 210—497 X |

FOREIGN PATENTS 20,139  8/1893  Great Britain.

REUBEN FRIEDMAN, *Primary Examiner.*

JOHN ADEE, *Assistant Examiner.*

U.S. Cl. X.R.

210—426, 440, 487

UNITED STATES PATENT OFFICE
CERTIFICATE OF CORRECTION

Patent No. 3,421,630                           January 14, 1969

William A. Acosta

It is certified that error appears in the above identified patent and that said Letters Patent are hereby corrected as shown below:

Column 4, line 33, "125" should read -- 124 --; line 51, "Flter" should read -- Filter --. Column 7, line 56, beginning with "One of the" cancel all to and including "screen filter." in line 65, same column 7, and insert > One of the features of the filter element of this invention is that a great deal of surface area for filtration is presented in a relatively small volume of space. Thus, a filtering surface area is present on both sides of the pleated ring 126, as is apparent from FIG. 8. The height of the ring 126 can be varied to suit the needs of the user. The surface area presented by the ring is substantially greater than that which could be obtained when using a horizontal screen filter.

Column 8, line 59, "fiuid" should read -- fluid --. Column 9, line 21, "secnod" should read -- second --.

Signed and sealed this 17th day of March 1970.

(SEAL)
Attest:

EDWARD M. FLETCHER, JR.                    WILLIAM E. SCHUYLER, JR.
Attesting Officer                              Commissioner of Patents